(12) United States Patent
Beresch et al.

(10) Patent No.: US 9,175,726 B2
(45) Date of Patent: Nov. 3, 2015

(54) BEARING MODULE (75) Inventors: Eduard Beresch, Sulzheim (DE);
Christian Schulte-Noelle, Bamberg (DE); Claus Mueller, Eckental (DE); Ahmed Hafit, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 557 days.

(21) Appl. No.: 12/991,209

(22) PCT Filed: May 5, 2009

(86) PCT No.: PCT/DE2009/000637
§ 371 (c)(1),
(2), (4) Date: Apr. 25, 2011

(87) PCT Pub. No.: WO2009/135482
PCT Pub. Date: Nov. 12, 2009

(65) Prior Publication Data
US 2011/0188794 A1    Aug. 4, 2011

(30) Foreign Application Priority Data

May 8, 2008  (DE) .......................... 10 2008 022 861
Sep. 23, 2008  (DE) .......................... 10 2008 048 412

(51) Int. Cl.
*F16C 33/62* (2006.01)
*F16C 33/44* (2006.01)
*F16C 23/04* (2006.01)
*F16C 33/20* (2006.01)

(52) U.S. Cl.
CPC .............. *F16C 33/44* (2013.01); *F16C 23/045* (2013.01); *F16C 33/201* (2013.01); *F16C 33/62* (2013.01)

(58) Field of Classification Search
CPC .......... F16C 33/44; F16C 33/62; F16C 33/201
USPC .................. 384/445, 492, 527, 573, 624, 625
See application file for complete search history.

(56) References Cited

U.S. PATENT DOCUMENTS

| 2,927,052 | A | * | 3/1960 | Moudry ..................... 204/157.4 |
| 3,390,928 | A |   | 7/1968 | William |
| 3,870,607 | A | * | 3/1975 | Bardach ......................... 205/122 |
| 5,352,046 | A | * | 10/1994 | Ward ............................. 384/492 |
| 2002/0191878 | A1 |  | 12/2002 | Ueda |
| 2005/0078899 | A1 |  | 4/2005 | Chatry |

FOREIGN PATENT DOCUMENTS

| DE | 69729791 T2 | 7/2005 |
| DE | 69921166 T2 | 3/2006 |
| EP | 1939472 A1 | 7/2008 |
| JP | 6050343 A | 2/1994 |
| JP | 2002106588 A | 4/2002 |
| JP | 2002147473 A | 5/2002 |
| WO | 2007/037267 A1 | 4/2007 |

* cited by examiner

*Primary Examiner* — Thomas R. Hannon
(74) *Attorney, Agent, or Firm* — Simpson & Simpson, PLLC

(57) ABSTRACT

A bearing module including a first bearing component and a second bearing component which are mounted such that the first bearing component and the second bearing component can move relative to one another, the first bearing component being an outer ring extending in a circumferential direction and the second bearing copmonent being a corresponding inner ring, a raceway is provided on one of the outer bearing and the inner bearing ring, and corrosion protection is provided at a side of the raceway, the corrosion protection being anodic corrosion protection and including one of a sacrificial anode or an impressed current anode. A separate protection means is provided, which is comprised of an oligodynamically acting material.

16 Claims, 5 Drawing Sheets

BEARING MODULE

This application is a 371 of PCT/DE2009/000637 filed May 5, 2009, which in turn claims the priority of DE 10 2008 022 861.3 filed May 8, 2008, and DE 10 2008 048 412.1 filed Sep. 23, 2008 the priority of both applications is hereby claimed and both applications are incorporated by reference herein.

FIELD OF THE INVENTION

The invention relates to a bearing module having a first and a second bearing component which are mounted such that they can move relative to one another.

A bearing module of the type mentioned initially is, for example, a linear bearing or a rotating bearing. The bearing module is in this case intended in particular for use predominantly underwater, which may be both fresh water and salt water. A bearing module such as this is used, for example, in underwater turbines, underwater drives, for example marine-vessel propulsion systems, or for marine-vessel rudders.

BACKGROUND TO THE INVENTION

It is known, for example, from marine-vessel design, that marine-vessel components, such as a marine-vessel hull, are frequently subject to growth of and incrustation by underwater organisms, such as barnacles. In general, such growth of underwater organisms on components is also referred to as fouling. Such fouling adversely affects the functionality and the operability of the relevant components to a considerable extent.

In order to counteract growth of underwater organisms, it is known, for example, from DE 699 21 166 T2 for marine components, to be provided with a fouling separation coating, and in this case by way of example DE 699 21 166T3 refers to a marine-vessel hull or a liquid collecting tube. For this purpose, an appropriate coating agent is applied to the typically pretreated marine component, for example by brush application or by spraying. Appropriate pretreatment of the marine component envisages, for example, application of a moist coating, of an adhesion promoter, etc. Said coating procedure has the disadvantage that it is correspondingly labor-intensive and, therefore, also costly.

DE 697 29 791T1 cites a black paint color, which impedes growth, for use as a means to impede growth in marine-vessel applications.

OBJECT OF THE INVENTION

The invention broadly comprises a bearing module including a first bearing component and a second bearing component which are mounted such that the first bearing component and the second bearing component can move relative to one another, the first bearing component being an outer ring extending in a circumferential direction and the second bearing component being a corresponding inner ring, a raceway is provided on one of the outer bearing ring and the inner bearing ring, and corrosion protection is provided at a side of the raceway, the corrosion protection being anodic corrosion protection and including one of a sacrificial anode or an impressed current anode. A separate protection means is provided, which is comprised of an oligodynamically acting material.

The invention is based on the object of specifying a bearing module which can be implemented easily and which is particularly suitable for underwater use.

ACHIEVEMENT OF THE OBJECT

According to the invention, the object is achieved by a bearing module having a first and a second bearing component which are mounted such that they are movable relative to one another, with a separate protection means being provided which is comprised of an oligodynamically acting material.

The invention is based on the idea that a bearing module which is intended for underwater use, for example for use in an underwater turbine, is lubricated to an increasing extent by the surrounding medium, that is to say water. This also increases the problem of so-called fouling to an increasing extent for bearing modules such as these.

The invention identifies the fact that growth of underwater organisms which emit calcium carbonate on the functional surfaces of the bearing module is a particular problem for maintaining the functionality of the bearing module. barnacles, for example, are among the underwater organisms which emit calcium carbonate. A functional surface of the bearing module is understood to be, in particular, a surface along which the bearing components move with respect to one another. In the case of a journal bearing, this is, in particular, a sliding surface along which the bearing components carry out a sliding movement. In the case of a roller bearing, such a functional surface is formed in particular by a rolling surface along which a number of roller bodies, which are mounting the bearing components, run. When growth takes place on a functional surface such as this, in particular of underwater organisms which emit calcium carbonate, damage to the functional surface caused by the relatively hard clacium carbonate deposits, which also have sharp edges, during operation of the bearing module is probable, in the end resulting in the risk of complete failure of the bearing module.

The invention also identifies that an "anti-fouling measure" which, in particular, envisages the application of a coating agent, for example a paint color which impedes growth or a fouling separation coating, to the surface of the bearing components of the bearing module, and in particular to the functional surfaces mentioned, is not only very complex, but appears to be completely unsuitable, in particular for the functional surfaces. For example, in particular in the case of the functional surfaces, it can be expected that abrasion will cause an increased wear to the coating agent that is applied as a paint color. The maintenance of protection against fouling growth can in this case, in particular, be ensured only by renewed application of the paint color to the corresponding surfaces, which is frequently found to be highly complex and costly over the life of the bearing module. Furthermore, it cannot be ruled out that the application of a coating agent, for example in the form of a paint color, changes the sliding characteristics or the running characteristics of a functional surface which is in the form of a sliding surface or rolling surface and, in some circumstances, this would result in a considerable influence on the functionality of the bearing module per se.

The invention now adopts an entirely different approach. This is because, instead of providing protection against fouling growth by the application of an appropriate coating agent to each individual surface to be protected, the invention provides a separate protection means. For this purpose, the protection means comprises an oligodynamically acting material. For the purposes of the following text, an oligodynamic effect means, in particular, an effect which damages or kills living underwater organisms, such as viruses, bacteria, and in particular also higher organisms such as algae, barnacles or mold. The effect can therefore be described as being biocidal. The oligodynamic effect of the material is achieved in particular by the emission of an active component of the material. The active component which, for example, is in the form of a salt, a dissolved component, as the material itself, for example in a colloidal distribution, or as ions of the material, is emitted from the protection means into the surrounding medium of water. The water, which in particular is enriched with the active component, flows through the bearing module. The biocidal effect which prevents fouling growth on the surfaces of the bearing module is therefore not dependent on direct contact between the protection means and the surface to be protected against fouling growth. Therefore, overall, it is possible to implement an effective measure against fouling growth without major design complexity, and with little labor effort, without having to accept the risk of influencing the functionality of the bearing module by an "anti-fouling measure".

Instead of this, it is sufficient for protection against fouling growth for the separate protection means which, in particular, is in the form of a separate component to simply be attached, for example, to essentially any desired point on the bearing module, for example by means of a screw connection, adhesive bonding or clipping. Alternatively, it is also possible to simply arrange the protection means in the relatively close vicinity of the bearing module. The protection means can also be fitted to an attachment element or to a housing of the bearing module, or can represent the attachment element or the housing itself.

Because the water enriched with the active component flows through the bearing module essentially all the time, it is possible to achieve effective and long-term protection against fouling growth on the components of the bearing module, and in particular on its functional surfaces.

The protection means is essentially not subject to any abrasion-intensive load. The protection against fouling growth offered by a protection means is therefore maintained, in some circumstances, throughout the life of the bearing module. If the protection means needs to be replaced or renewed, this can be done easily and therefore does not involve any substantial cost beyond the value of the material.

The bearing module as such may be both in the form of a journal bearing and a roller bearing. This in turn makes it possible for the bearing components to be able to rotate in the form of a rotating bearing, or to be mounted such that they can move translationally with respect to one another, in the form of a linear bearing.

The material preferably comprises an oligodynamically acting metal. Oligodynamically acting metals are, for example, mercury, silver, copper and its alloys brass and bronze, tin, iron, lead and bismuth. Among these metals, silver and copper are considered to be advantageous, because of their environmental compatibility and effectiveness. Of these, copper is preferred, for financial reasons. The oligodynamic effect of said metals is based primarily on the emission of their biocidally acting cations, which represent the active components of the respective metals.

The protection means comprises the oligodynamic material for example in such a way that the protection means is entirely or partially coated with the material. As an alternative to this, the material is, for example, incorporated in the protection means. However, the protection means is preferably manufactured from the material. This represents a variant which can be implemented particularly easily in production.

As mentioned initially, the bearing module may be both a journal bearing and a roller bearing. Which of the mentioned variants is chosen depends essentially on the requirements for the specific application environment of the bearing module. Factors which may be mentioned in this case and which characterize the operating conditions include, for example, a bearing load, an operating temperature, an available installation space or a speed at which the bearing components are intended to be moveable with respect to one another. In normal underwater applications of the drive module, for example for use in an underwater turbine, it is frequently necessary for the bearing components to be able to move quickly with respect to one another. This can be achieved effectively in particular by means of a roller bearing.

The bearing components are preferably mounted such that they can move relative to one another by means of a number of roller bodies. By way of example, balls, cylindrical rollers, needle rollers, conical rollers or barrel-shaped rollers may be used as roller bodies.

In one advantageous embodiment variant, a cage is provided, in which the roller bodies are accommodated. A cage in general guides the roller bodies, keeps them at a uniform distance from one another, and thereby prevents the roller bodies from touching one another. By way of example, the cage may be manufactured from a steel, in particular a stainless steel. Alternatively, for example, the cage can also be manufactured from a suitable plastic or from brass.

Advantageously the protection means is attached to the or each bearing component. For this purpose, by way of example, the protection means may be fitted by means of a "non-detachable" attachment, for example adhesive bonding or welding. In order to allow the protection means to be replaced without complications, it is, however, expedient, to produce a detachable connection between the corresponding bearing component and the protection means, for example by means of a screw connection or clipping. Attaching the protection means to the bearing component makes it possible for the bearing module to be made available with the protection means as a preassembled unit in a compact form.

In a further advantageous embodiment variant, the protection means is attached to the cage. This embodiment variant may be provided alternatively or in addition to the attachment of the protection means to a bearing component. This fitting is particularly advantageous since the flow conditions in the area of the cages can be influenced locally in particular by a running movement of the roller bodies in such a way as to further assist, in particular, the water that is enriched with the active component effectively flowing through the bearing module. In the end, this contributes to a further improvement in the protection against fouling growth.

The protection means advantageously has an attachment means for attachment. The attachment means is, in particular, an integral component of the protection means, and is designed to be attached to the cage and/or to a bearing component. The attachment means allows the protection means to be fitted easily and in particular reversibly to the cage and/or the corresponding bearing component. The reversible fitting of the protection means considerably simplifies and facilitates any replacement or renewal of the protection means which may in some circumstances be necessary. For this purpose, the attachment means is, for example, in the form of a plug head which can easily be hooked into an appropriate plug-in location on the cage and/or the bearing component. The attachment means may likewise be in the form of a bracket or a clip element.

In one advantageous embodiment, the attachment means is in the form of a screw means. In this case, in particular, the attachment means is designed like a shank and has a screw thread. The protection means can in this way easily be screwed via the attachment means into the corresponding attachment surface of the cage and/or the bearing component. The use of a screw connection for attachment is particularly suitable for the intended purpose since, on the one hand, this makes it possible to ensure that the protection means is held firmly, and on the other hand the screw connection can be detached again without major effort, for example if it is necessary to replace the corresponding protection means.

A separating means is preferably arranged between the protection means and the or each bearing component and/or the cage. In particular, the separating means is intended to prevent direct contact between the protection means and the cage and/or the bearing component, in particular to prevent contact corrosion. By way of example, contact corrosion is possible when corresponding pairs of materials in the components make contact. By way of example, contact corrosion is to be expected when all the components involved, that is to say the protection means on the one hand and the cage and/or the corresponding bearing component on the other hand, are manufactured from a metal, but the corresponding metals are not noble to the same extent in accordance with the electrochemical potential series. According to the electrochemical potential series, metals can be subdivided into "noble" and "non-noble", in which case a non-noble metal corrodes when it makes contact with a more noble metal. The separating means prevents this effect. For this purpose, the separating means is, in particular, manufactured from a non-conductive material, for example from a plastic.

The bearing components are expediently in the form of an outer ring, which extends in a circumferential direction, and a corresponding inner ring. In this case, the bearing components are mounted such that they can rotate with respect to one another in the circumferential direction. The inner ring and the outer ring, which are occasionally also referred to in the following text as bearing rings, can for this purpose be mounted, for example, by means of a number of roller bodies. Alternatively, it is likewise possible for the bearing rings to be able to move such that they "slide" with respect to one another. By way of example, a suitable sliding coating is applied to the or each bearing ring for a sliding movement with as little wear as possible.

In a further advantageous embodiment variant, the protection means is annular. The annular protection means makes it possible to achieve a very uniform distribution of the active component in the area around the bearing module, thus making it possible to further improve the protection against fouling growth. By way of example, an appropriate clipping-in groove can be provided in the or each bearing ring, for attachment of the protection means. The specification of a clipping-in groove makes it possible to attach the annular protection means in a particularly simple manner to one of the bearing rings, or preferably to both bearing rings, simply by clipping it in.

BRIEF DESCRIPTION OF THE DRAWING

Exemplary embodiments of the invention will be explained in more detail with reference to a drawing, in which.

DETAILED DESCRIPTION OF THE DRAWING

Figure 1:
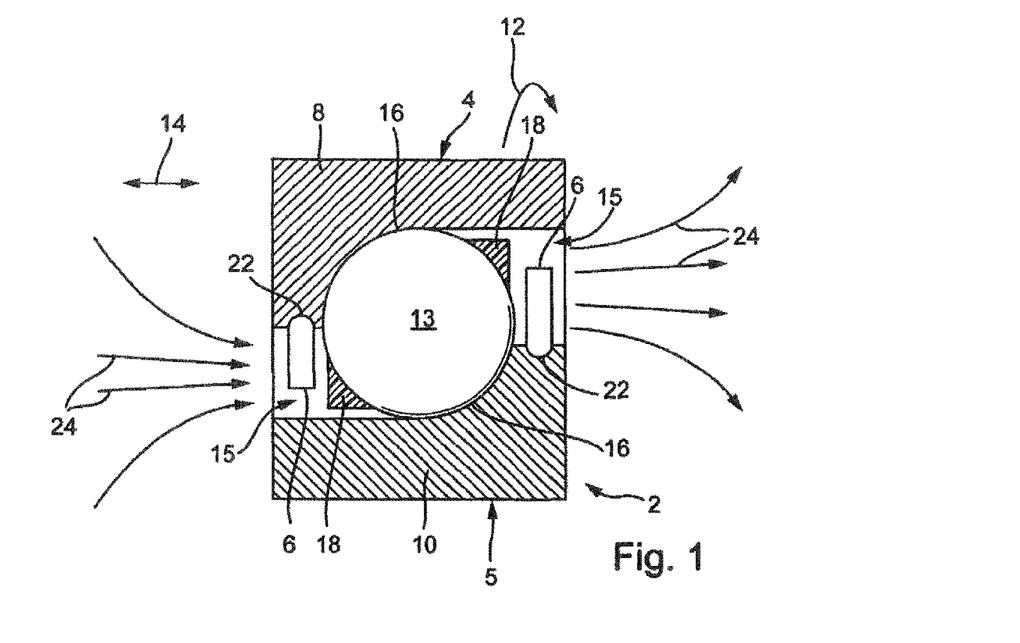
FIG. 1: shows a first embodiment of a bearing module.

FIG. 1 shows a cross-sectional view of a first embodiment of a bearing module 2. The bearing module 2 is intended in particular for use predominantly underwater, for example under seawater. In this case, by way of example, the bearing module 2 is used in underwater turbines, in underwater drives, for example marine-vessel propulsion systems, or for marine-vessel rudders.

As shown in the illustration, the bearing module 2 comprises a first and a second bearing component 4, 5, as well as a protection means 6. The bearing components 4, 5 are in the form of an outer ring 8 and an inner ring 10. In the following text, the outer ring 8 and the inner ring 10 are also occasionally referred to as bearing rings 8, 10. The bearing rings 8, 10 each extend along a circumferential direction 12, and are mounted such that they can move with respect to one another by means of a number of roller bodies 13.

The outer ring 8 and the inner ring 10 are not sealed from one another. Instead of this, an opening slot 15 is provided on both sides in a flow direction 14. The medium surrounding the bearing module 2, which in this case is the surrounding water, can flow through the bearing module 2 through the opening slot 15.

The roller bodies 13, of which a single one can be seen in the cross-sectional illustration, roll during operation of the bearing module 2 on a respective rolling surface 16 of the inner ring 10 and of the outer ring 8. During use, one of the bearing rings 8, 10 is, in particular, stationary, and the correspondingly other bearing ring 10, 8 rotates about a central rotation axis of the bearing module 2, in the circumferential direction 12. The roller bodies 13 are arranged between the inner ring 10 and the outer ring 8.

Each of the roller bodies 13 is accommodated in pockets, which cannot be seen here, of a cage 18, such that the roller bodies 13 are held at a uniform distance from one another. This prevents the roller bodies 13 from impeding one another as they revolve.

The protection means 6, which has a cross section in the form of a pin, is manufactured from copper. In order to achieve a uniform distribution of the biocidally acting copper cations, a multiplicity of protection means 6 are attached to the bearing module 2 along the circumferential direction 12. However, as an alternative to this, it is also possible for the protection means 6 to be designed to run in an annular shape in the circumferential direction 12. The protection means 6 is attached to the outer ring 8, to the inner ring 10 and to the cage 18. In this case, the protection means 6 is in each case arranged on only one side of the outer ring 8 and of the inner ring 10 with respect to a direction transverse to the flow direction 14. In the illustration, the protection means 6 is arranged on the inner ring 10 "to the right" of the roller body 13 with respect to the direction transverse to the flow direction 14, while it is arranged "to the left" of it on the outer ring 8, thus overall resulting in the protection means 6 being arranged on both sides. For attachment of the protection means 6, both bearing rings 8, 10 each have a corresponding clipping-in groove 22, into which the protection means 6, which is in the form of a pin, is clipped. By way of example, clipping the protection means 6 into the respective clipping-in groove 22 makes it possible to replace or to renew the protection means 6 when required, without major effort. Alternatively, of course, it is also possible to attach the protection means 6 to the bearing rings 8, 10 by means of an adhesive joint.

In the environment in which the bearing module 2 is intended to be used, underwater, there is a risk of undesirable growth of underwater organisms, for example algae or barnacles, on the bearing module 2. This is also referred to as fouling. Such fouling adversely affects the functionality and the operability of the bearing module 2, to a considerable extent. In particular, an accumulation of organisms which emit calcium carbonate, such as barnacles, on the running surfaces 16 of the bearing module 2 run a risk of massive damage to the running surfaces 16 because of the relatively hard calcium carbonate deposits. During operation of the bearing module 2, the roller bodies 13, which run on the running surface 16 of the inner ring 10 and of the outer ring 8, "roll over" these calcium carbonate deposits, thus also resulting in sharp-edged fragments, which can damage the running surfaces 16. Ultimately, this can lead to total failure of the bearing module 2.

In order to ensure protection against such fouling growth, the protection means 6 is manufactured from an oligodynamically acting metal, in this case from copper. In the following text, an oligodynamic effect means a damaging or lethal effect on living underwater organisms, in particular such as algae, mold and barnacles. The effect can therefore be described as being biocidal. The oligodynamic effect of copper is based essentially on the copper cations which are emitted from the copper into the surrounding medium, that is to say in this case into the water. The water which has been enriched with the biocidally acting copper cations flows through the bearing module 2. This "flushing" is illustrated in the figure by the flow lines 24 shown by way of example. Since the protection means 6, as stated further above, is arranged on both sides with respect to a direction transverse to the flow direction 14, it is ensured that the water which has been enriched with the copper cations flows through the bearing module 2 independent of the instantaneous flow direction of the water. The biocidal effect which prevents fouling growth on the surfaces of the bearing module 2 is, overall, not dependent on direct contact between the protection means 2 and the surface to be protected against growth.

The water which has been enriched with the copper cations flowing essentially continuously through the bearing module 2 makes it possible to achieve effective and long-term protection against fouling growth on the components of the bearing module 2, such as the cage 18, the bearing components 4, 5, the roller bodies 13 and, in particular, the running surfaces 16. Overall, it is possible to provide an effective measure against fouling growth without major design effort, and with little labor expenditure.

Figure 2:
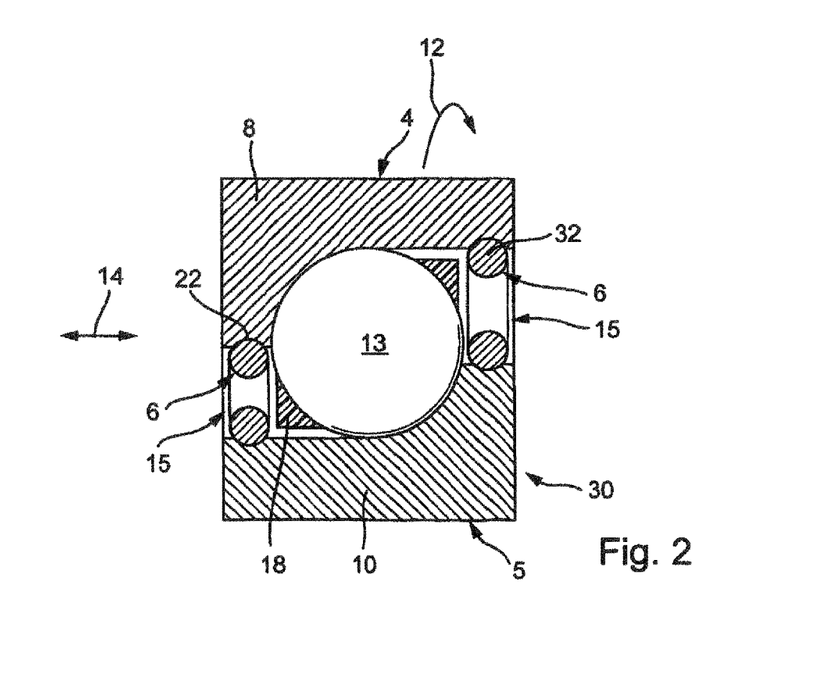
FIG. 2: shows a second embodiment of a bearing module.

FIG. 2 shows a cross section of a second embodiment variant of a bearing module 30. The design of the bearing module 30 corresponds essentially to the design of the bearing module 2 illustrated in FIG. 1. In this case, the protection means 6 is likewise attached both to the outer ring 8 and to the inner ring 10. In contrast to FIG. 1, the protection means 6, which has a round cross section, is, however, in this case not in the form of a pin, but is in the form of a ring 32 which extends in the circumferential direction 12. The corresponding ring 32 is in each case arranged on both sides of the outer ring 8 and of the inner ring 10 with respect to a direction transverse to the flow direction 14. The ring 32, which runs in the circumferential direction 12, is for this purpose clipped into a corresponding clipping-in groove 22 in the inner ring 10 and in the outer ring 8.

Figure 3:
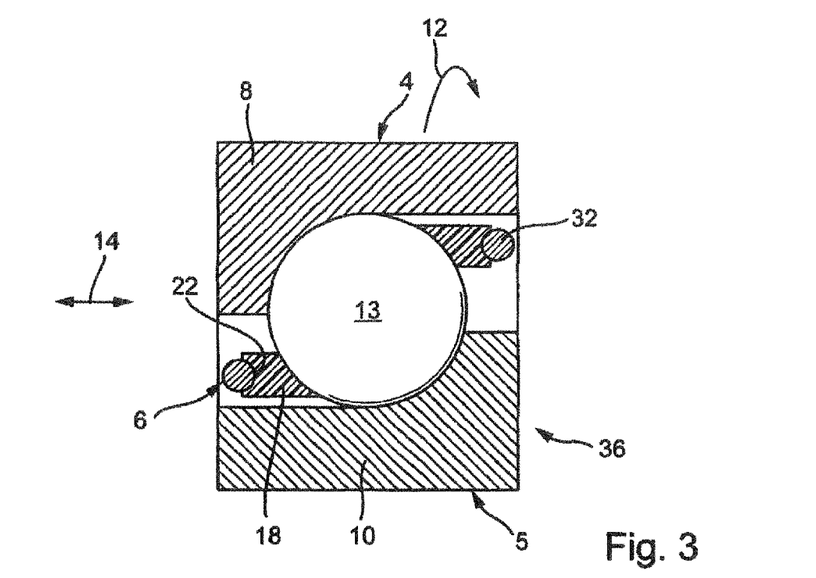
FIG. 3: shows a third embodiment of a bearing module.

FIG. 3 shows a cross section of a third embodiment variant of a bearing module 36. In contrast to the protection means 6 in FIG. 1 and FIG. 2, the protection means 6 here is not attached to the bearing components 4, 5 but to the cage 18. In this case, once again, the protection means 6 is in the form of a ring 32 which runs in the circumferential direction 12 and is clipped into a corresponding clipping-in groove 22 in the cage 18.

Figure 4:
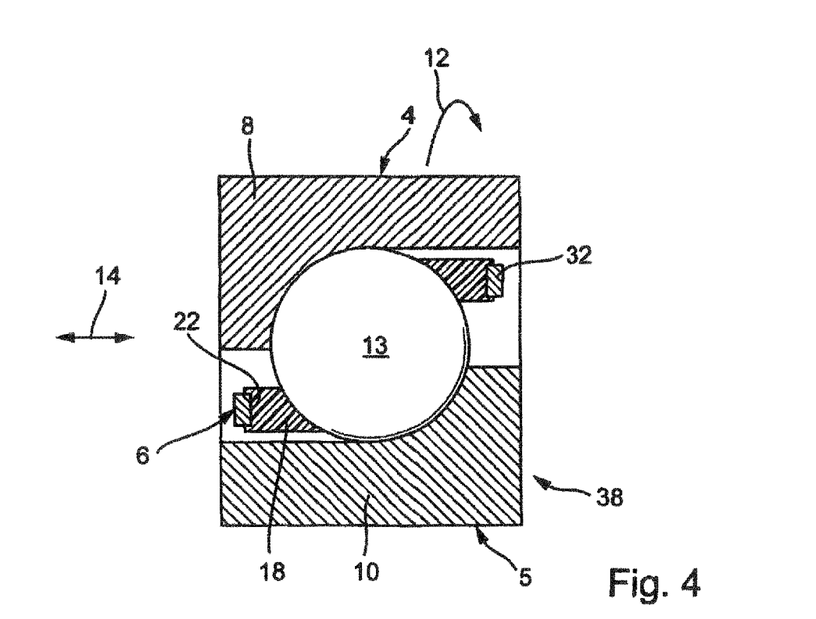
FIG. 4: shows a fourth embodiment of a bearing module.

FIG. 4 shows a fourth embodiment variant of a bearing module 38. As in FIG. 3, the protection means 6 is in this case also attached to the cage 18. However, in this case, the protection means 6 is not in the form of a ring 32, but is cuboid.

Figure 5:
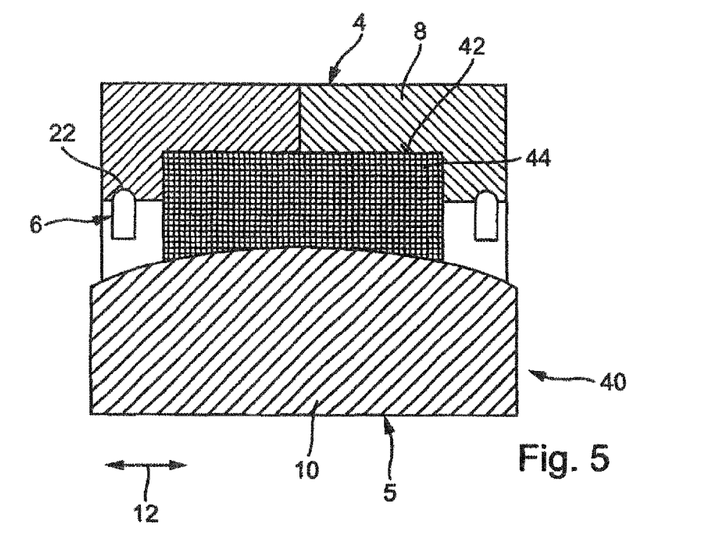
FIG. 5: shows a fifth embodiment of a bearing module.

FIG. 5 shows a cross section, running along the circumferential direction 12, of a fifth embodiment variant of a bearing module 40. In contrast to the embodiments already described, the bearing module 40 is not in the form of a roller bearing, but is a journal bearing. During operation of the bearing module 40, one of the bearing rings 8, 10 slides on the correspondingly other, in particular stationary, bearing ring 10, 8, and in the process rotates about a central rotation axis of the bearing module 2 in the circumferential direction 12. The sliding movement of the rings 8, 10 in this case takes place over a sliding surface 42, on which a suitable sliding coating 44 is applied, for a sliding movement with as little wear as possible.

The protection means 6, which is in the form of a pin, is in this case fitted to the outer ring 8. In particular, the protection means 6 is to prevent fouling growth on the sliding surface 42.

Figure 6:
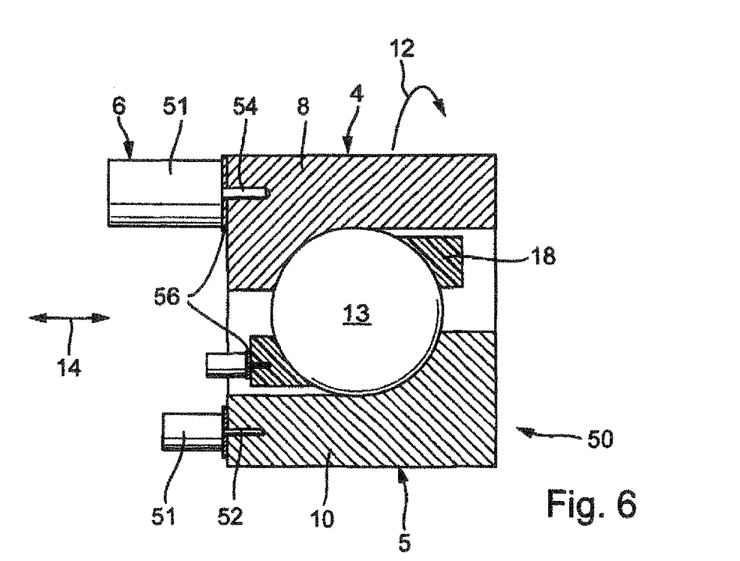
FIG. 6: shows a sixth embodiment of a bearing module.

FIG. 6 shows a sixth embodiment variant of a bearing module 50. The bearing module 50 is designed essentially in the same way as the embodiment variants already described, and is once again a roller bearing.

In contrast to the description for the previous exemplary embodiments, the protection means 6 is in the form of a cylindrical body 51, which is manufactured from the oligodynamically acting copper. In order to achieve a uniform distribution of the biocidally acting copper cations, a multiplicity of protection means 6 is attached to the bearing module 2. In this case, the visible protection means 6 is attached to the outer ring 8, to the inner ring 10 and to the cage 18. For attachment, the protection means 6 has an attachment means 52 which, in this case, is in the form of a screw means 54. The screw means 54 is in the form of a shank and has a screw thread. The screw means 52 of the protection means 6 makes it possible to attach the protection means 6 in a particularly simple manner to the corresponding attachment surface of the cage 18, and of the inner ring 10 and outer ring 8. The attachment by means of a screw connection is particularly suitable since this on the one hand ensures that the protection means 6 is held firmly, and on the other hand the screw connection can be released again without major effort, for example in order to replace or to renew the corresponding protection means 6.

Separating means 56 is in each case arranged between the cage 18 and the bearing rings 10, 8 on one hand and the respective protection means 6 attached thereto on the other hand. In this case, the separating means 56 is in the form of a washer manufactured from a suitable plastic.

The separating means 56 is intended in particular to prevent direct contact between the protection means 6 and the cage 18 and the bearing rings 8, 10, in order, in particular, to prevent contact corrosion.

Figure 7:
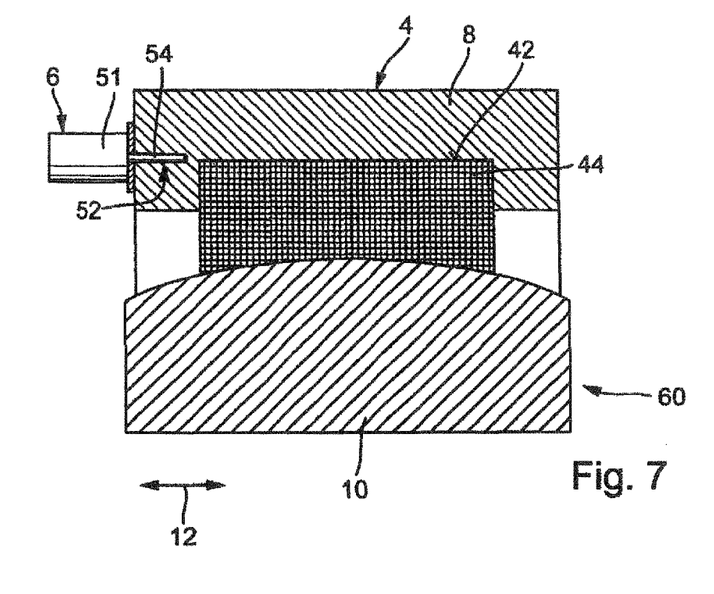
FIG. 7: shows a seventh embodiment of a bearing module.

FIG. 7 shows a seventh embodiment of a bearing module 60, in which the bearing module 60 is in the form of a journal bearing. The visible protection means 6 is attached to the outer ring 8 via its screw means 54.

Figure 8:
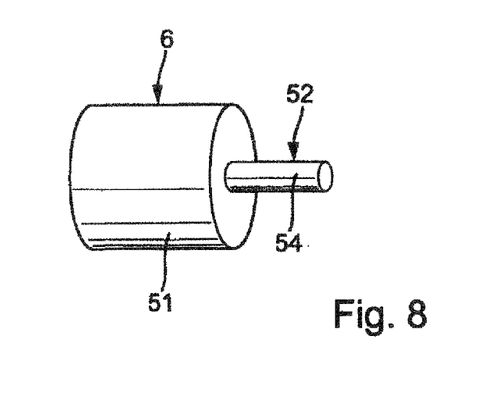
FIG. 8: shows a detailed view of a protection means.

FIG. 8 schematically illustrates a detail view of a protection means 6 as shown in FIG. 6 and FIG. 7. The cylindrical base body 51 and the attachment means 52 for the protection means 6 can be seen particularly well in the detail view. As can be seen, this results overall in the protection means 6 having a very compact form, thus considerably simplifying fitting of the bearing module 2.

Figure 9:
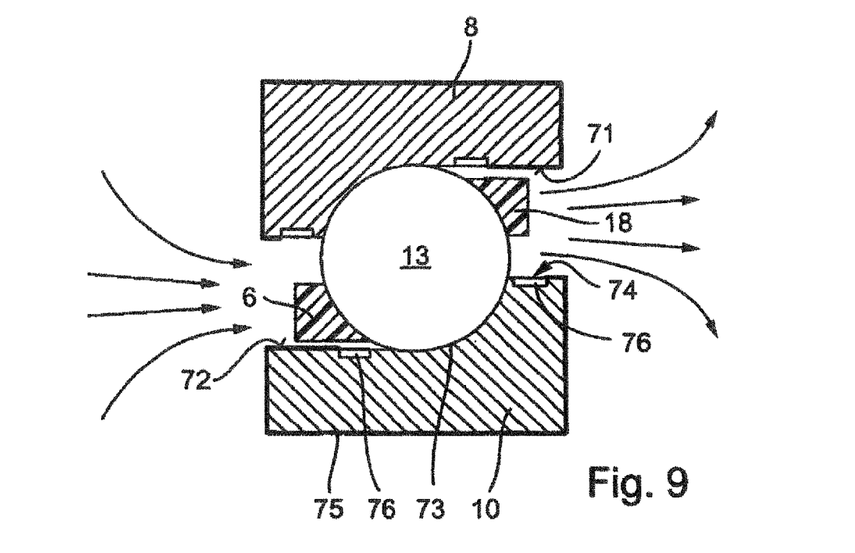
FIG. 9: shows an eighth embodiment of a bearing module.

FIG. 9 shows an eighth embodiment of a bearing module 70 which comprises, as bearing components, an outer ring 8 and an inner ring 10 as well as a cage 18, with the cage 18 guiding roller bodies 13, only one of which is illustrated.

The cage 18 has a protection means 6; in particular, the protection means 6 is arranged on the surface of the body of the cage 18 and is in the form, in particular, of a metallic coating, specifically composed of copper, on the surface of the body of the cage 18. Furthermore, the roller bodies 13 are formed from an electrically non-conductive material, specifically from ceramic. The non-conductive roller bodies 13 prevent contact between the copper coating on the body of the cage 18 and the material of the body of the two bearing rings 8, 10, as a result of which no contact corrosion can occur when the chemically noble copper is electrically conductively connected to the chemically less noble material of the bearing rings 8, 10, for example roller-bearing steel. In order to prevent this contact corrosion during operation of the bearing module 70, the cage 18 is guided by means of the roller bodies 13 in such a way that it is possible to prevent contact with one of the bearing rings 8, 10 or with a shelf.

The roller bodies 13 may also be produced from glass or plastic, instead of from ceramic. Instead of using copper, it is also possible to use another biocidal material, for the coating on the body of the cage 18, in particular also a different biocidally acting metal, for example silver or bronze. The coating can completely cover the body of the cage 18, or may be provided only in places; in particular, the coating may be provided on those sections of the body of the cage 18 which do not come into contact with the material of this bearing ring when the cage 18 is guided by one of the two bearing rings 8, 10, such that, in this case, the body of the cage 18 prevents contact corrosion, and roller bodies 13 may be provided which are electrically conductive. Specifically, the biocidally acting coating composed of a metal such as copper or silver may be provided in places on those surface sections of the body of the cage 18 which face the inner lateral area 71 of the outer ring 8 and/or the outer lateral area 72 of the inner ring 10.

With regard to the material of the biocidally acting coating on the body of the cage 13, it is also possible for the coating to be composed of a material such as a plastic, in which biocidally acting metals are incorporated as particles.

Corrosion protection 74 is provided at the side of a respective raceway 73 on the two lateral areas 71, 72 of the two bearing rings 8, 10 which form the internal area of the bearing, with the intension of preventing corrosion, specifically pitting corrosion of the chemically non-noble material of the two bearing rings 8, 10, in particular of the roller-bearing steel. The corrosion protection 74 comprises a passive corrosion coating 75 composed of a polymer lacquer, which covers the inner lateral areas 71, 72 apart from the raceway 73 and the two end surfaces, as well as the outer lateral areas of the two bearing rings 8, 10 with respect to the bearing interior.

The corrosion protection 74 furthermore comprises anodic corrosion protection 76, in particular an impressed current anode, which is arranged adjacent to the raceway 73, between the raceway 73 and the passive corrosion coating 75. Since the effect of the impressed current anode decreases exponentially with the distance from the anode, the anodic corrosion protection 76 is arranged closer to the raceway 73 than the passive corrosion coating 75. Because of the physical proximity between the anodic corrosion protection 76, specifically the impressed current anode, and the raceway 73, the anode can demand only a small amount of power, and can nevertheless offer adequate protection for the raceway 73. The concentration of the anodic corrosion protection, specifically of the impressed current anode, on that section of the respective inner lateral area 71, 72 which is directly adjacent to the raceway 73 also prevents the occurrence of creepage currents.

The passive corrosion coating 75 reduces the area of the bearing interior which may be subject to corrosion to the area immediately adjacent to the raceway 73. In this area, in which the passive corrosion coating 75 is subject to a very severe mechanical load during operation, because the roller bodies 13 roll over it, the protection against corrosion is provided by the anodic corrosion protection 76, specifically the impressed current anode, thus considerably suppressing the corrosion overall for the entire interior of the bearing.

Figure 10:
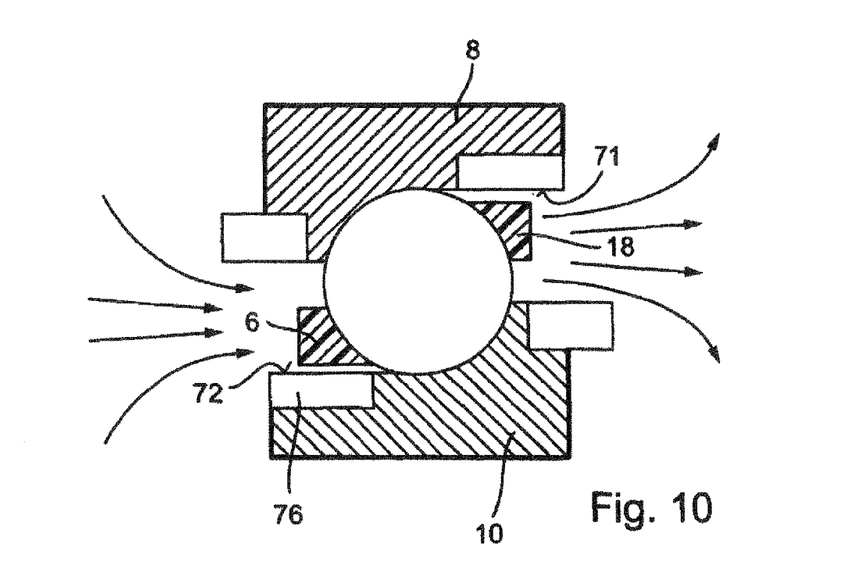
FIG. 10: shows a ninth embodiment of a bearing module.

The ninth embodiment, which is illustrated in FIG. 10, differs only slightly from the eighth embodiment as illustrated in FIG. 9, as a result of which the same or comparable parts in the eighth and ninth embodiments are provided with the same reference symbols. The differences between the ninth embodiment and the eighth embodiment are explained in the following text.

The bearing rings 8, 10 illustrated in FIG. 10 have only anodic corrosion protection 76 on the inner lateral areas 71, 72, which corrosion protection 76 is provided by a sacrificial electrode composed of a material such as aluminum, magnesium or zinc which is chemically less noble than the material of the two bearing rings 8, 10 (in the present case, roller-body steel). The anodic corrosion protection 76 is in the form of an insert which extends as close as possible to the raceway 73. The end surfaces of the two bearing rings 8, 10 as well as the outer lateral surfaces of the two bearing rings 8, 10 are surrounded by a passive corrosion coating which, however, does not extend into the bearing interior.

LIST OF REFERENCE SYMBOLS

2 Bearing module
4 Bearing component
5 Bearing component
6 Protection means
8 Outer ring
10 Inner ring
12 Circumferential direction
13 Roller body
14 Flow direction
15 Opening slot
16 Rolling surface
18 Cage
22 Clipping-in groove
24 Flow lines
30 Bearing module
32 Ring
36 Bearing module
38 Bearing module
40 Bearing module
42 Sliding surface
44 Sliding coating
50 Bearing module
51 Cylindrical body
52 Attachment means
54 Screw means
56 Separating means
60 Bearing module
70 Bearing module
71 Inner lateral area
72 Outer lateral area 73 Raceway
74 Corrosion protection
75 Corrosion coating
76 Anodic corrosion protection

The invention claimed is:

1. A bearing module, comprising:
   a first bearing component and a second bearing component which are mounted such that the first bearing component and the second bearing component can move relative to one another, the first bearing component being an outer ring extending in a circumferential direction and the second bearing component being a corresponding inner ring;
   a raceway is provided on one of the outer bearing ring and the inner bearing ring, and corrosion protection is provided at a side of the raceway, the corrosion protection being anodic corrosion protection and including one of a sacrificial anode or an impressed current anode; and
   wherein a separate protection means is provided, which is comprised of an oligodynamically acting material.

2. The hearing module as claimed in claim 1, wherein the anodic corrosion protection is provided adjacent the raceway, and in that a passive corrosion coating is provided at a greater distance from the raceway.

3. The bearing module as claimed in claim 1, wherein the separate protection means is annular.

4. The bearing module as claimed in claim 1, wherein the separate protection means consists of the material.

5. The bearing module as claimed in claim 1, wherein the first bearing component and the second bearing component are mounted such that the first bearing component and the second bearing component can move relative to one another by means of a plurality of roller bodies.

6. The bearing module as claimed in claim 5, wherein a cage is provided, in which the roller bodies are accommodated.

7. The bearing module as claimed in claim 6, wherein the separate protection means is attached to the cage.

8. The bearing module as claimed in claim 6, wherein the protection means is attached to the or each bearing component.

9. The bearing module as claimed in claim 8, wherein the protection means has an attachment means for attachment.

10. The bearing module as claimed in claim 9, wherein the attachment means is a screw means.

11. The bearing module as claimed in claim 8, wherein a separating means is arranged between the protection means and the or each bearing component and/or the cage.

12. The bearing module as claimed in claim 6, wherein the separate protection means is arranged on a surface of a body of the cage.

13. The bearing module as claimed in claim 12, wherein the protection means is in the form of a coating on the surface of the cage.

14. The bearing module as claimed in claim 13, wherein the protection means is a metallic coating and in that the roller bodies are formed from an electrically non-conductive material.

15. The bearing module as claimed in claim 14, wherein the metallic coating is copper.

16. The bearing module as claimed in claim 1, wherein the corrosion protection comprises a passive corrosion coating comprising a polymer lacquer.

* * * * *